UNITED STATES PATENT OFFICE.

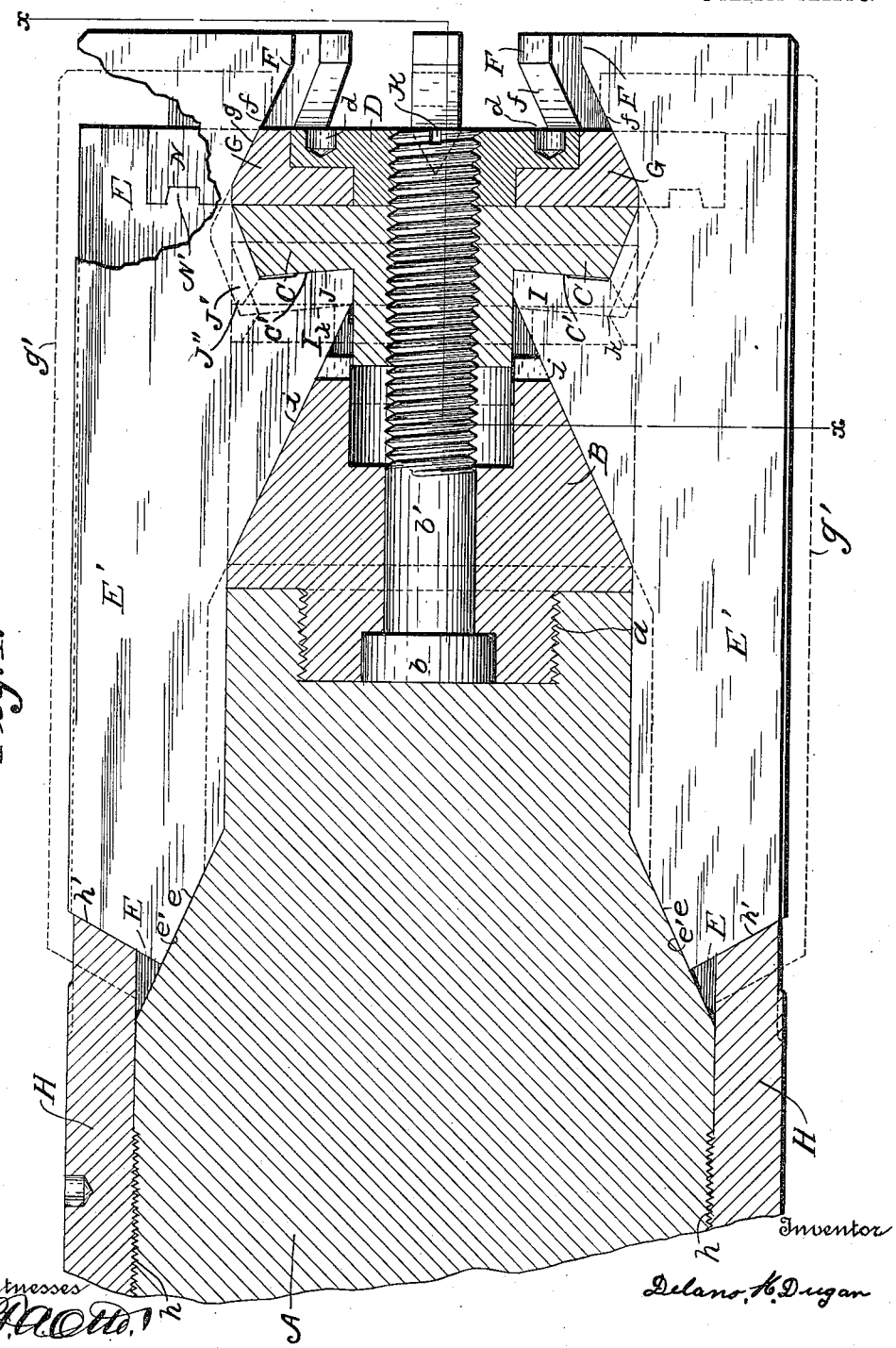

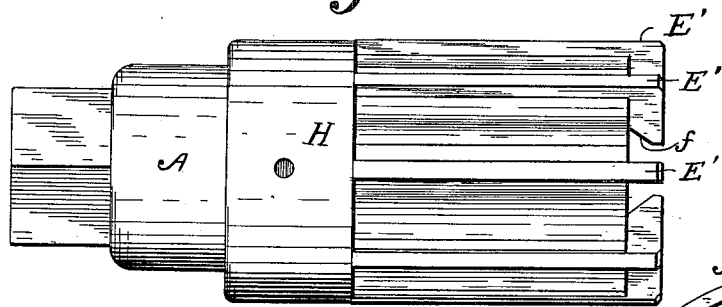
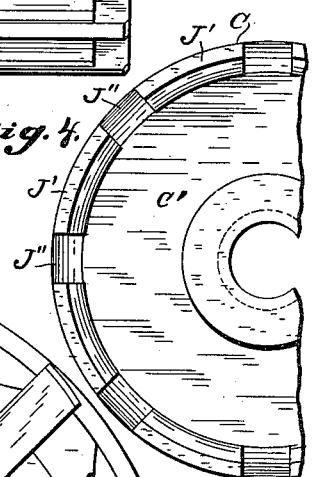
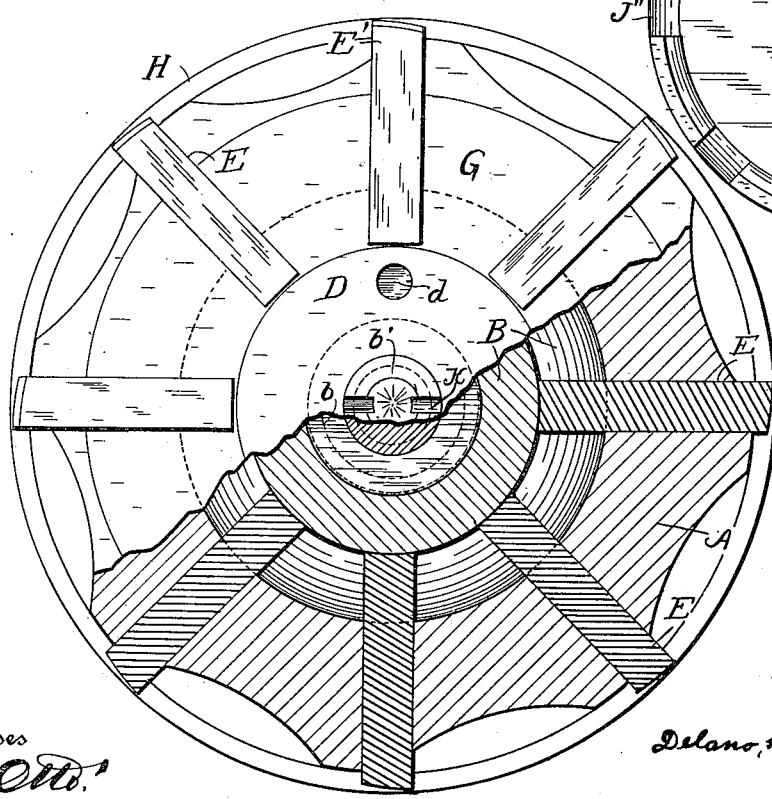

DELANO H. DUGAR, OF MILWAUKEE, WISCONSIN.

EXPANSION-REAMER.

1,033,998.    Specification of Letters Patent.    Patented July 30, 1912.

Application filed November 23, 1911. Serial No. 661,946.

*To all whom it may concern:*

Be it known that I, DELANO H. DUGAR, a citizen of the United States, residing at Milwaukee, in the county of Milwaukee and State of Wisconsin, have invented a new and useful Expansion-Reamer, of which the following is a specification.

My invention relates to improvements in expansion reamers.

The object of my invention is to provide improved means for holding and adjusting the cutting blades, whereby the adjusting operation may be facilitated, exact adjustments secured, and the adjusting mechanisms housed in such a manner as to effectively exclude dirt and grit.

In the following description, reference is had to the accompanying drawings, in which—

Figure 1 is a view, in longitudinal section, of the working end of a tool embodying my invention. Fig. 2 is a side view of the tool. Fig. 3 is an end view of the working end, partially broken away, and showing the body and blades in cross section on line $x$—$x$ of Fig. 1. Fig. 4 is a detail view of the nut C as seen from its inner face.

Like parts are identified by the same reference numerals throughout the several views.

The shank or body A is provided with a socket in one end, which receives a conically tapered portion B, having screw threaded connection therewith at $a$. This tapered portion B is provided with a recess at its inner end to receive the head of a bolt $b$, the shank of the bolt $b'$ passing through an aperture in the tapered member B and having its outer end threaded and adapted to receive an adjusting nut C and a locking nut D. The body A is provided with peripheral channels E, adapted to receive the cutting blades E'. These channels extend entirely through the cylindrical portion of the body which covers the socket in which member B is seated, so that the blades E' may have a bearing upon the member B as hereinafter explained. Each of these cutting blades is provided with a tapered rear inner margin $e$, adapted to bear upon the inclined face $e'$, constituting the bottom of the channel E at its rear end. The front end of each blade E' is provided with an inwardly projecting lip F, having an inclined face $f$ extending rearwardly and outwardly from near the front end of the tool, this inclined face $f$ being parallel with the inclined face $e$. A stationary collar G is seated against the end of the body A in a recess formed therein, and this collar is also provided with channels in its periphery adapted to receive the blades E'. The bases of the channels in the collar are inclined as shown at $g$, the inclination being the same as that of the angular margin $f$ of the blade lip F. It is obvious that when the blade E' is moved rearwardly along the body A, the inclined faces $f$ and $e$, moving upon the inclined bases of the respective channels in the body A and collar G, will cause the blades to also move outwardly to the position indicated by the dotted lines $g'$ in Fig. 1. This rearward and outward movement of the blades may be permitted by adjusting the sleeve nut H rearwardly on the body A. Said sleeve nut has threaded engagement with the body at $h$, and its front end is forwardly tapered and bears upon a correspondingly tapered portion of the blade E' at $h'$, whereby rearward pressure upon the blade tends to force it under the sleeve nut H, and maintain the engagement of the inclined surface $e$ with the base channel $e'$.

Each of the blades E' is provided, intermediate of its ends, with an inwardly projecting lip I. This lip has a rearwardly and outwardly extending inclined margin $i$, which is adapted to bear upon the cone shaped member B. The front margin J of the lip is adapted to fit against the rear face C' of the nut C, the face C' of the nut being undercut, as clearly shown in Fig. 1. Each of the lips I is also provided with an inclined margin J' which is seated in a channel J'' in the nut C, whereby the blades prevent the nut from rotating. The sleeve nut H projects over, and with a rearwardly inclined bearing on the rear ends of the blades at $h'$, and therefore the rearward pressure of nut C cannot crowd the blades out of position. Said blades will therefore be permitted to move outwardly to the positions indicated by the dotted lines $g'$, (or to intermediate positions), only when sleeve nut H is moved rearwardly to permit the blades also to move rearwardly along the inclined faces $g$, $e'$, and the conical surface of the member B.

The collar G is provided with a groove N tapering toward its base, and the end portions of the body A between the blades are provided with ribs N' which enter these grooves. The collar G, therefore, supports those portions of the body A between the channels E and blades E', and protects the interior parts from grit.

The nut C is adjusted by turning the bolt b', this bolt being provided with means whereby it may be rotated from the exterior. For this purpose the bolt is provided with a slot K, adapted to receive a suitable tool such as a screw-driver. When the bolt b' is turned, the nut C will feed inwardly or outwardly, according to the direction of rotation. In Fig. 1, the nut C is in its outermost position, from which it may move inwardly as indicated by the dotted lines at k. The lock nut D is provided with sockets d to receive a spanner wrench, whereby this nut may be turned into and out of binding engagement with the collar G. The nut D is preferably countersunk in the collar G, as shown, whereby, when it is in locking position, the outer face of the nut D will be in the same plane as the outer face of the collar G.

The operation of the tool will be readily understood from the foregoing description: Assuming the blades to be in the position in which they are shown in Fig. 1, if it is desired to adjust them outwardly, the sleeve nut H is first loosened and moved rearwardly along the body A sufficiently to permit the desired adjustment. Lock nut D is then loosened, whereupon a screw-driver is applied to the slot K in the bolt b', and said bolt rotated to cause a rearward movement of the nut C which carries with it all of the blades E' by engagement with their inwardly projecting lips I, and during this rearward movement, the blades will be forced outwardly by their bearings upon the conical member B and the inclined channel bases e' and g. When the blades have moved rearwardly into binding reëngagement with the sleeve nut H, the desired adjustment being secured, lock nut D will be again turned until it binds upon the collar G, whereupon all the parts will be locked in the new position of adjustment.

I claim—

1. An expansion reamer comprising the combination of a longitudinally channeled body, having the bases of the channels inclined at their rear ends and provided with a socket in its front end into which said channels open, a tapered member seated in said socket, a collar member provided with open ended slots having inclined bases, a set of reaming blades seated in the body channels and each having a plurality of inclined marginal inner faces, bearing upon the tapered member and upon the inclined bases of the body channels and collar slots respectively, and a set of clamping nuts adapted to hold said blades in different positions of adjustment, along said inclined faces.

2. An expansion reamer comprising the combination of a longitudinally channeled body, having the bases of the channels inclined at their rear ends and provided with a socket in its front end into which said channels open, a tapered member seated in said socket, a collar member provided with open ended slots having inclined bases, a set of reaming blades seated in the body channels and each having a plurality of inclined marginal inner faces, bearing upon the tapered member and upon the inclined bases of the body channels and collar slots respectively, and a set of clamping nuts adapted to hold said blades in different positions of adjustment along said inclined faces, one of said nuts having threaded engagement with the body and the other being supported from said tapered member.

3. An expansion reamer comprising the combination of a longitudinally channeled body, having the bases of the channels inclined at their rear ends and provided with a socket in its front end into which said channels open, a tapered member seated in said socket, a collar member provided with open ended slots having inclined bases, a set of reaming blades seated in the body channels and each having a plurality of inclined marginal inner faces, bearing upon the tapered member and upon the inclined bases of the body channels and collar slots respectively, and a set of clamping nuts adapted to hold said blades in different positions of adjustment along said inclined faces, one of said nuts being threaded upon the body and engaging the rear ends of the blades, together with a bolt swiveled to the tapered member and supporting the other nut.

4. An expansion reamer comprising the combination of a longitudinally channeled body, having the bases of the channels inclined at their rear ends and provided with a socket in its front end into which said channels open, a tapered member seated in said socket, a collar member provided with open ended slots having inclined bases, a set of reaming blades seated in the body channels and each having a plurality of inclined marginal inner faces, bearing upon the tapered member and upon the inclined bases of the body channels and collar slots respectively, and a set of clamping nuts adapted to hold said blades in different positions of adjustment, along said inclined faces, one of said nuts having threaded engagement with the body and the other being supported from said tapered member, said nuts being formed to overhang a portion of each blade in opposite directions, to hold them firmly in contact with said projections.

5. An expansion reamer comprising a longitudinally channeled body, a bolt swiveled to one end thereof, a set of reamer blades mounted in the body channels, nuts mounted on the body and bolt respectively and adapted to adjustably clamp said blades between them, means for rotating said bolt to move the nut thereon into and out of clamping position, and means for actuating said blades radially when the nuts are shifted to move the blades longitudinally.

6. An expansion reamer comprising a longitudinally channeled body, a bolt swiveled to one end thereof, a set of reamer blades mounted in the body channels, nuts mounted on the body and bolt respectively, and adapted to adjustably clamp said blades between them, means for rotating said bolt to move the nut thereon into and out of clamping position, and means for actuating said blades radially when the nuts are shifted to move the blades longitudinally, together with means for locking said nuts in any position of adjustment, said blades each having longitudinally inclined bearings at a plurality of points upon the body and a portion of the locking means.

7. An expansion reamer comprising a longitudinally channeled body, a tapered detachable member secured to one end thereof, a bolt swiveled to said member and projecting longitudinally therefrom, a collar fitted to the end of said body and peripherally slotted to correspond with the channels of said body, each of said slots having an inclined base, a set of blades adapted to enter said slots and channels, and each provided with a set of inwardly extending projections adapted to bear upon said tapered member and upon the bases of the collar slots respectively, a nut on said bolt adapted to engage one of the projections on each blade to push the blades rearwardly and outwardly along said inclined and tapered surfaces, and a sleeve nut on the body against which the rear ends of the blades may be pushed, said body channels also having inclined bases along which said blades move when actuated by said nuts.

8. An expansion reamer comprising a longitudinally channeled body, a tapered detachable member secured to one end thereof, a bolt swiveled to said member and projecting longitudinally therefrom, a collar fitted to the end of said body and peripherally slotted to correspond with the channels of said body, each of said slots having an inclined base, a set of blades adapted to enter said slots and channels, and each provided with a set of inwardly extending projections adapted to bear upon said tapered member and upon the bases of the collar slots respectively, a nut on said bolt adapted to engage one of the projections on each blade to push the blades rearwardly and outwardly along said inclined and tapered surfaces, and a sleeve nut on the body against which the rear ends of the blades may be pushed, said body channels also having inclined bases along which said blades move when actuated by said nuts, together with means for locking said nuts in any desired position of adjustment, and holding said slotted collar in position on the body.

9. An expansion reamer comprising a longitudinally channeled body, a bolt swiveled to one end thereof, a set of reamer blades mounted in the body channels, nuts mounted on the body and bolt respectively and adapted to adjustably clamp said blades between them, said bolt being adapted to be actuated from the exterior to move the nut thereon into and out of clamping position, and means for actuating said blades radially when the nuts are shifted to move the blades longitudinally, said nut having grooves in its outer margin adapted to receive portions of the blades, whereby the nut is held against rotation.

10. An expansion reamer comprising a longitudinally channeled body, a bolt swiveled to one end thereof, a set of reamer blades mounted in the body channels, nuts mounted on the body and bolt respectively and adapted to adjustably clamp said blades between them, said bolt being adapted to be actuated from the exterior to move the nut thereon into and out of clamping position, means for actuating said blades radially when the nuts are shifted to move the blades longitudinally, together with a collar having interlocking engagement with the front ends of the body members, and a locking nut on said bolt for holding said collar in position, said collar and locking nut being adapted to close the end of the reamer and protect the interior from grit.

In testimony whereof I affix my signature in the presence of two witnesses.

DELANO H. DUGAR.

Witnesses:
F. A. OTTO,
IRENE L. DUGAR.